J. W. THROPP.
MEANS FOR ADJUSTING ROLLS.
APPLICATION FILED APR. 27, 1920.

1,352,999.

Patented Sept. 14, 1920.
4 SHEETS—SHEET 1.

Inventor—
Joseph W. Thropp.
by his Attorneys

J. W. THROPP.
MEANS FOR ADJUSTING ROLLS.
APPLICATION FILED APR. 27, 1920.

1,352,999.

Patented Sept. 14, 1920.
4 SHEETS—SHEET 2.

Inventor—
Joseph W. Thropp.
by his Attorneys.

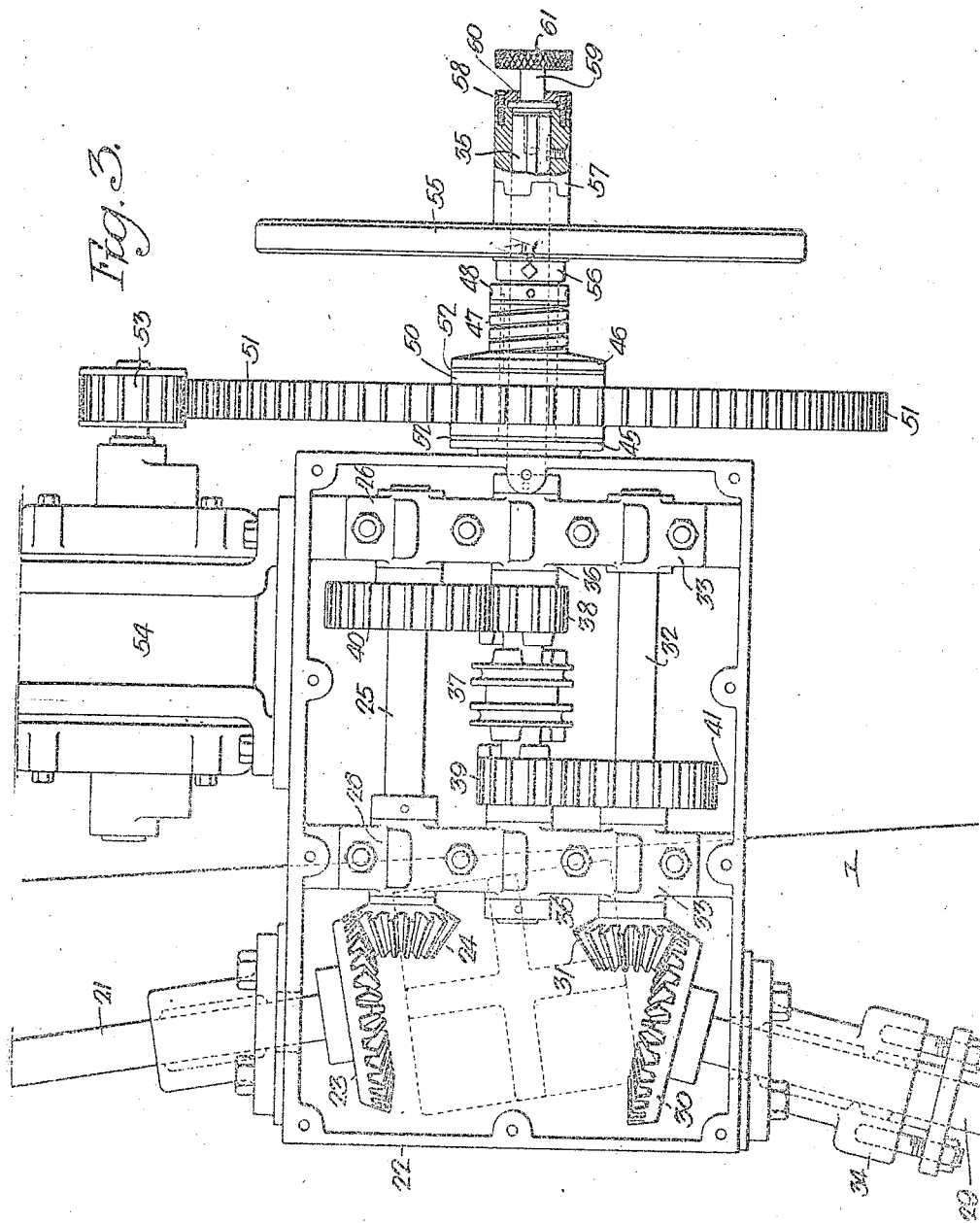

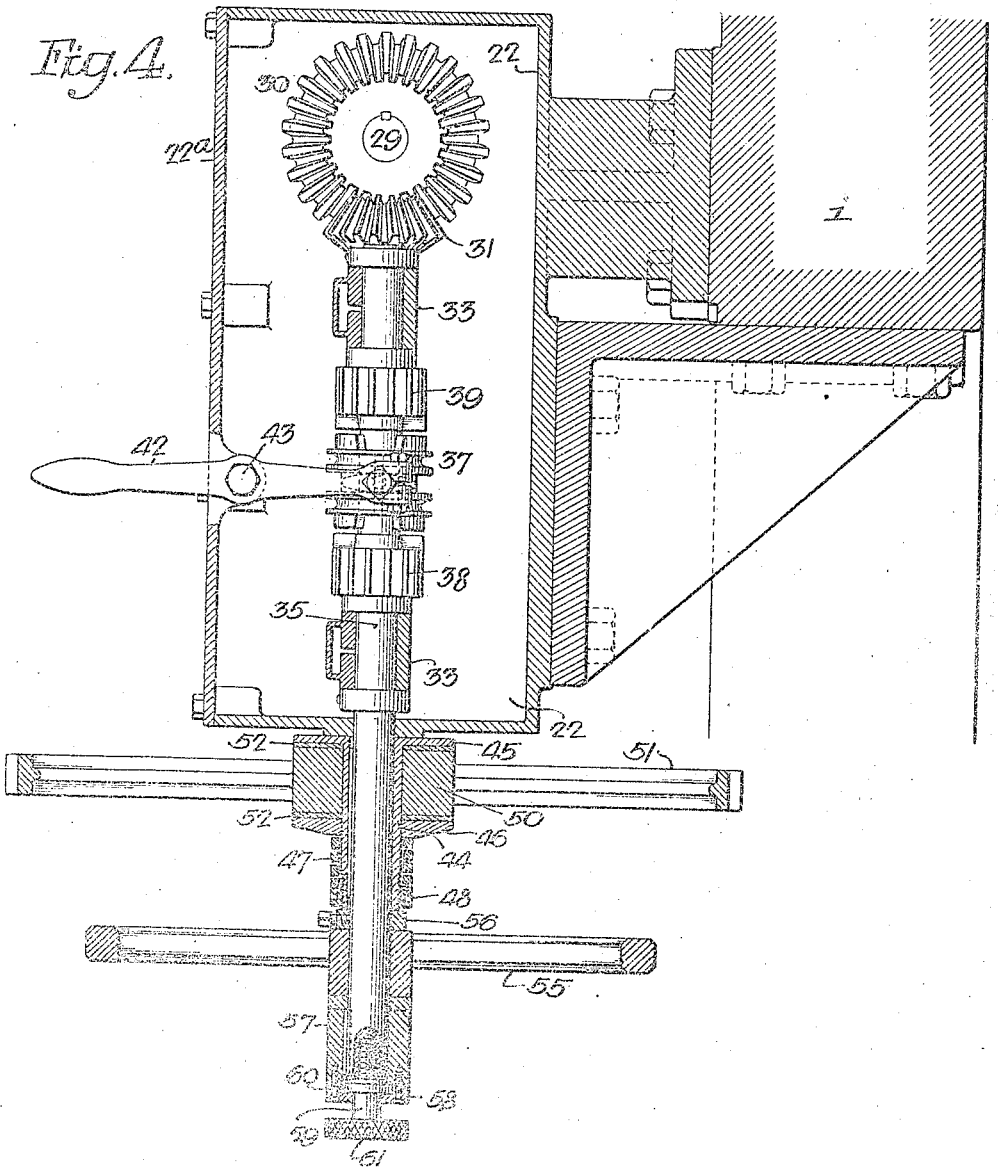

UNITED STATES PATENT OFFICE.

JOSEPH W. THROPP, OF TRENTON, NEW JERSEY.

MEANS FOR ADJUSTING ROLLS.

1,352,999.

Specification of Letters Patent. Patented Sept. 14, 1920.

Application filed April 27, 1920. Serial No. 377,017.

*To all whom it may concern:*

Be it known that I, JOSEPH W. THROPP, a citizen of the United States, residing in Trenton, Mercer county, New Jersey, have invented certain Improvements in Means for Adjusting Rolls, of which the following is a specification.

One object of my invention is to provide power driven means by which the upper roll or the lower roll of a calendering machine can be adjusted.

A further object of the invention is to provide friction mechanism between the power driven mechanism and the adjusting screws.

My invention also relates to further details, which will be fully described hereinafter, reference being had to the accompanying drawings, in which:

Fig. 3 is a side view with the cap plate of the gear box removed; and

Fig. 4 is a sectional plan view on the line 4—4, Fig. 2.

Figure 1:
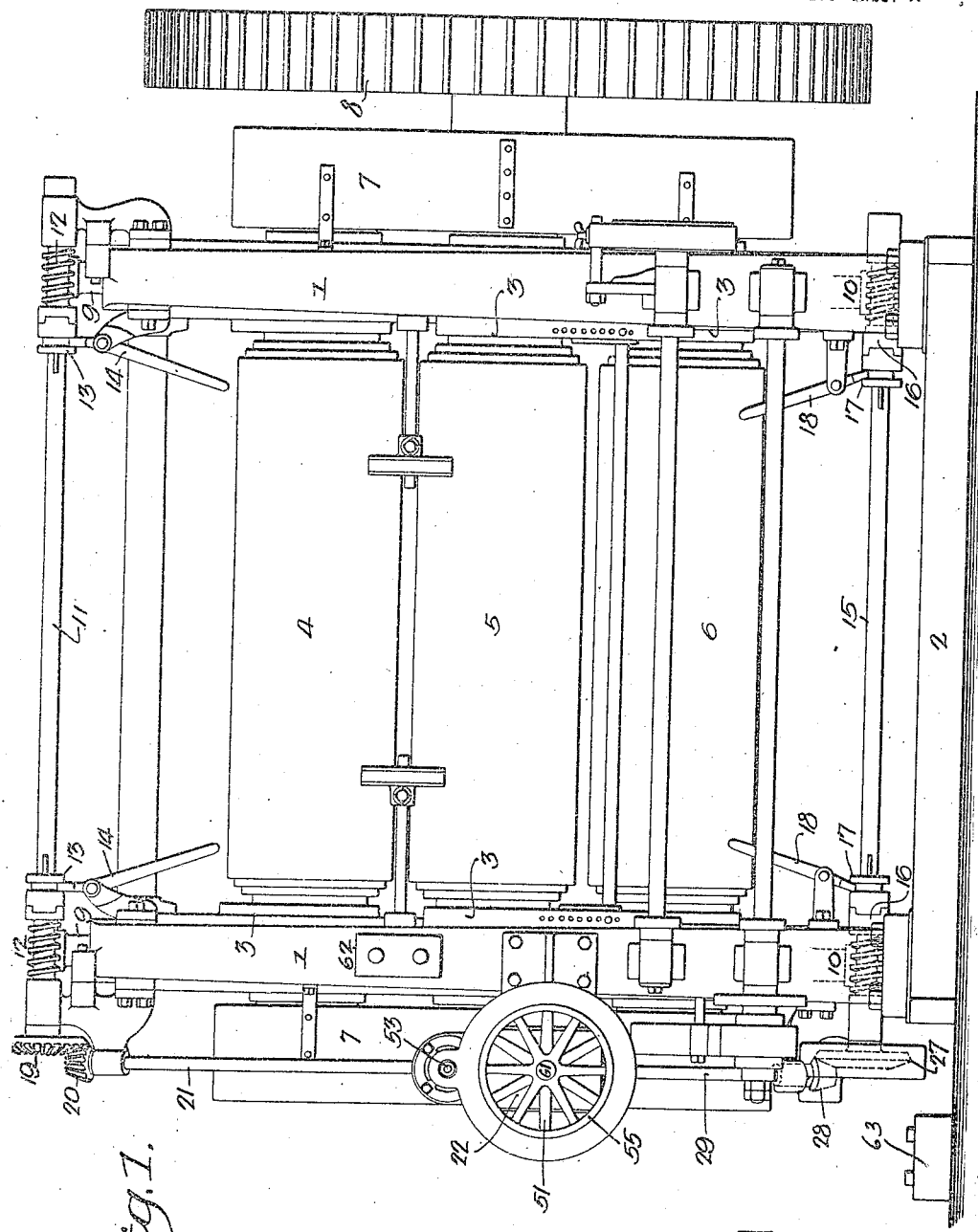
Figure 1 is a front elevation illustrating my invention.
Figure 2:
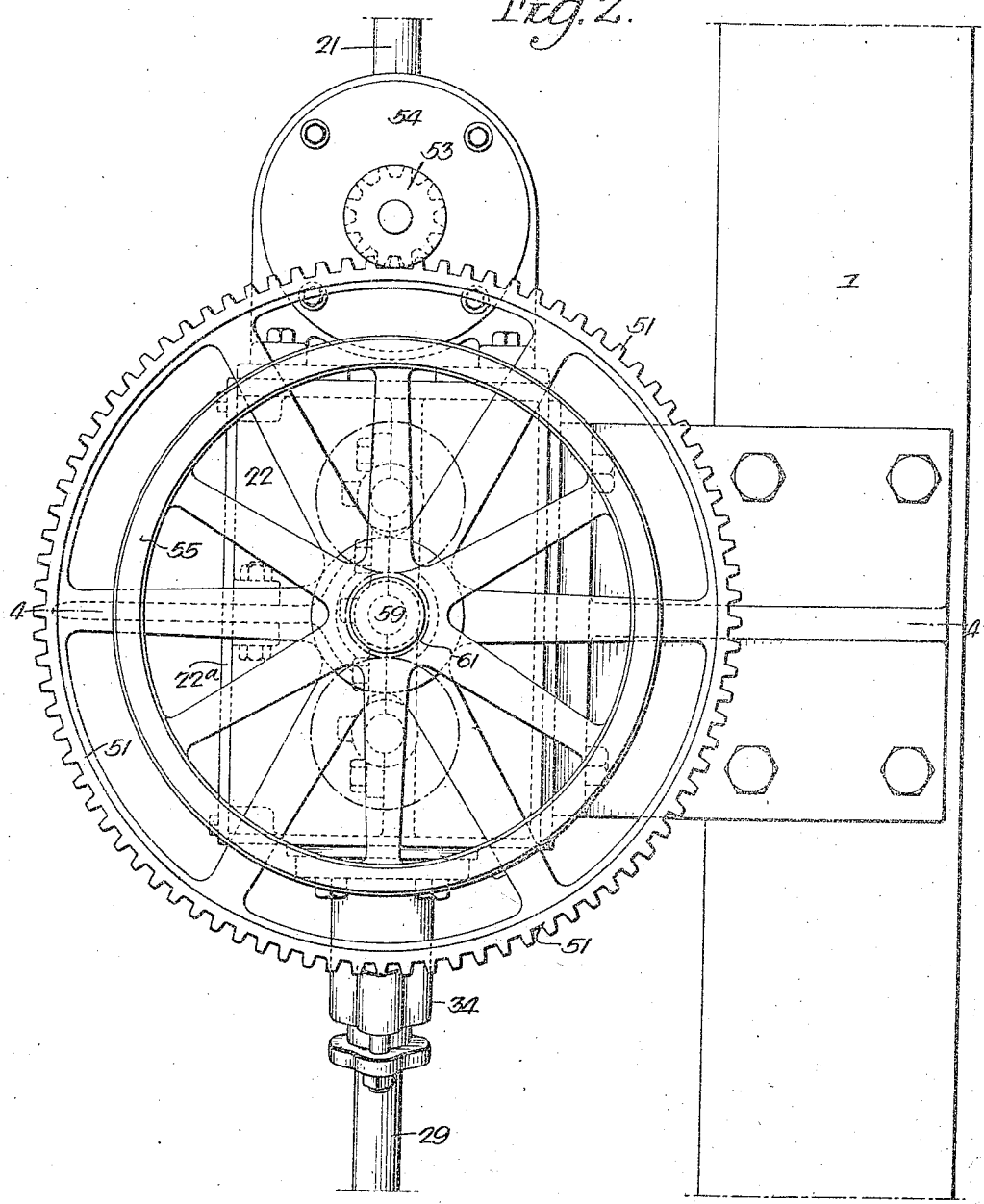
Fig. 2 is an enlarged front elevation of a portion of Fig. 1.

1, 1 are the housings mounted on a suitable base 2, and adapted to bearings 3 in the housings are the three calendering rolls 4, 5 and 6. These rolls are geared together. The gears are located in the casings 7 and are of the usual construction. 8 is the driving gear wheel for said rolls. 9, 9 are the upper adjusting screw mechanisms through which the upper roll 4 is raised or lowered. 10 is the lower roll adjusting mechanism through which the roll 6 is raised and lowered. The mechanisms 9 on each side are connected by a shaft 11. Loosely mounted on this shaft are the worms 12, which gear with the worm wheels of the adjusting-mechanisms 9. The worm wheels 12 can be clutched to the shaft 11 by clutches 13 operated by hand levers 14 pivoted to brackets on the frame of the machine. 15 is a lower shaft, similar in construction to the shaft 11, and worm wheels loose on this shaft can be clutched to the shaft by the clutches 17, operated by the handled levers 18. On the end of the shaft 11 is a beveled gear wheel 19, which meshes with a beveled gear wheel 20 on the upper end of a diagonal shaft 21, which extends into a gear box 22 and has a beveled gear wheel 23 at its lower end which meshes with a beveled pinion 24 on a shaft 25 adapted to bearings 26 in the box 22. The lower shaft 15 has a beveled gear wheel 27, shown by dotted lines in Fig. 1, which meshes with a beveled pinion 28 on a diagonal shaft 29. The upper end of this shaft extends into the gear box 22 and has a bevel wheel 30 at its upper end, which meshes with a bevel pinion 31 on a shaft 32 adapted to bearings 33 of a box 22. The lower diagonal shaft 29 passes through a stuffing box 34 bolted to the casing so as to prevent the lubricant in the casing from escaping at this point. 35 is the main shaft, which is adapted to bearings 36 in the casing.

The caps of the bearings 26, 33 and 36 are made integral, in the present instance. On the shaft 35 is a clutch sleeve 37 having jaws at each end and loose on the shaft 35 are pinions 38 and 39, one on each side of the clutch sleeve 37. These pinions have jaws which are arranged to be engaged by the jaws of the clutch sleeve. On the shaft 25 is a gear wheel 40, which meshes with a pinion 38 and on the shaft 32 is a gear wheel 41, which meshes with a pinion 39. When the clutch sleeve 37 is in the mid position, as shown in Figs. 3 and 4, the shaft 35 can be turned without turning the shafts 25 and 32. A shifting lever 42, pivoted at 43 to the casing, has a handle extending through the cap 22ª of the casing. On operating this lever, the sleeve can be thrown in engagement with the pinion 38 or the pinion 39. The shaft 35 extends beyond the casing and secured to this shaft is a sleeve 44 having a flange 45. Mounted on the sleeve is a collar 46, back of which is a spring 47 held by a nut 48 adapted to the screw threaded portion of the sleeve 44. Between the flange 45 and the collar 46 is located the hub 50 of a large gear wheel 51. Between the hub, the collar and the flange are friction disks 52. The gear wheel 51 meshes with a pinion 53 of a reversing electric motor 54. By the above construction, the shaft 35 is driven by friction from the motor. The motor is controlled by the usual switch mechanism, governed by the switches shown at 62 and 63.

When it is wished to operate the upper screw mechanism to adjust the roll 4, then the clutch sleeve is moved into engagement with the pinion 38 on the shaft 35 and motion is imparted from the motor through the friction drive mechanism and the gearing to the adjusting means 9. When it is wished to adjust the lower roll 6, then the clutch sleeve 37 is moved into engagement with the pinion 39 and the mechanism 10 can be driven from the motor through the friction mechanism and the gearing to said adjusting mechanism.

On the shaft 35 is a hand wheel 55, which is located between a collar 56, secured to the shaft, and a sliding hub 57 mounted on the end of the shaft, and which has projections adapted to enter recesses in the hub of the wheel 55. The sliding hub 57 has a cap 58, through which extends a screw 59, the threads of which enter a screw-threaded opening in the end of the shaft 35 and this screw has a flange 60 extending between the cap 58 and the hub 57, as shown clearly in Fig. 4. On the end of this screw is a knurled hand wheel 61 by which it can be turned so that when it is desired to disconnect the hand wheel 55 from the shaft 35, all that is necessary is to back off the screw 59 and disengage the sliding head 57 from the wheel.

The switches 62 and 63 may have the usual type for controlling the reverse motor. The box 63 is located so that it can be operated by the foot while the box 62 is located in one of the housings 1, and in such position that it can be operated by hand.

By the above construction, it will be seen that I locate the mechanism within easy reach of the operator and so connect the gear with a reversing motor that the mechanism for adjusting the upper or lower roll of the calendering machine can be actuated by operating the ordinary electric switch and shifting the clutch sleeve within the box 22. The box is so designed that the gear will work in a lubricant and this lubricant will be confined to a box.

I claim:—

1. The combination in a calendering machine, of a series of rolls, independent means for adjusting the upper roll and the lower roll; a gear box; a power driven shaft in the box and means for independently driving the adjusting means for the upper and lower rolls from said shaft; a reversing motor driving the shaft; and switch mechanism controlling the motor.

2. The combination in a calendering machine, of a series of means for adjusting the upper and the lower roll of the series; a gear box; gearing in said box for independently driving the upper adjusting means; a power driven shaft; and a clutch sleeve on said shaft arranged to be thrown into gear with either set of gearing to operate the upper or the lower adjusting means.

3. The combination of a calendering machine having housings and rolls; independent means for adjusting the upper roll and independent means for adjusting the lower roll; a driven shaft; a clutch mounted on the shaft and arranged to drive either the upper or the lower adjusting mechanism; a reversing electric motor; and a friction drive between the motor and the driven shaft, and a switch for controlling the motor.

4. The combination in a calendering machine, of a series of rolls; means for adjusting the upper rolls; means for adjusting the lower rolls; a gear box; gearing therein, one set of gearing being geared to the upper adjusting means and the other set of gearing being geared to the lower adjusting means; a driven shaft; a clutch thereon; means for shifting the clutch into engagement with either set of adjusting means; a reversing electric motor having a pinion; a gear wheel loose on said shaft and meshing with the pinion; friction mechanism between the wheel and the shaft; and a switch controlling the motor.

5. The combination in a calendering machine; of a series of rolls; means for independently adjusting the upper rolls and means for independently adjusting the lower rolls, each including a horizontal shaft; screws geared to said shaft; two diagonal shafts, one geared to the upper horizontal shaft and the other geared to the lower horizontal shaft; a driven shaft; two horizontal shafts, one on each side of the said driven shaft, one of said shafts being geared to one diagonal shaft and the other to the other diagonal shaft; clutch mechanism through which the short horizontal shafts are driven from the driven shaft; a reversing electric motor; and friction mechanism between the motor and the driven shaft.

6. The combination in means for independently adjusting the upper and lower rolls of a calendering machine, of a gear box; a driven shaft; a clutch sleeve on said shaft; gearing through which the clutch sleeve is arranged to drive the upper or the lower adjusting mechanism; a sleeve secured to said driven shaft and having a flange; a collar mounted on the sleeve; a spring back of the collar; a gear wheel, the hub of which is mounted on the sleeve between the flange and the collar; and a motor geared to said gear wheel.

7. The combination in adjusting means for the upper and lower rolls of a calendering machine, of a driven shaft; gearing for the upper driving means and gearing for the lower driving means; clutch mechanism for connecting the driven shaft to either of said gearing; a gear wheel frictionally mounted on the said shaft; a motor for driving said gear wheel; a hand wheel loose on said shaft; an adjustable sliding hub engaging the hand wheel; and means for adjusting said hub so as to engage or disengage the hand wheel and the shaft.

8. The combination in a calendering machine, of housings; a series of rolls mounted in the housings; means for driving the rolls; means for adjusting the upper rolls consisting of two screws; a horizontal shaft geared to the screws; means for adjusting the lower roll including two screws; a horizontal shaft geared to the screws; a gear box; a driven shaft; two short horizontal shafts within the gear box; a gear wheel on each shaft; two pinions loose on the driven shaft; one meshing with one gear wheel and the other meshing with the other gear wheel; a clutch sleeve mounted on the driven shaft and arranged to engage either one of the pinions; two diagonal shafts, one geared to one short horizontal shaft within the gear box and to the upper horizontal shaft, the other geared to the other short horizontal shaft within the gear box and with the lower horizontal shaft; a reversing electric motor having a pinion; a gear wheel meshing with the pinion; a sleeve on the driven shaft and on which the last mentioned gear wheel is mounted; friction mechanism between the gear wheel and the sleeve; and a hand wheel also mounted on the driven shaft.

JOSEPH W. THROPP.